(12) United States Patent
Ullrich et al.

(10) Patent No.: US 10,429,933 B2
(45) Date of Patent: Oct. 1, 2019

(54) AUDIO ENHANCED SIMULATION OF HIGH BANDWIDTH HAPTIC EFFECTS

(71) Applicant: IMMERSION CORPORATION, San Jose, CA (US)

(72) Inventors: Christopher J. Ullrich, Ventura, CA (US); William S. Rihn, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/894,168

(22) Filed: Feb. 12, 2018

(65) Prior Publication Data

US 2018/0164896 A1   Jun. 14, 2018

Related U.S. Application Data

(63) Continuation of application No. 14/582,404, filed on Dec. 24, 2014, now Pat. No. 9,891,714.

(51) Int. Cl.

| G06F 3/01 | (2006.01) |
|---|---|
| G06F 3/16 | (2006.01) |
| G08B 6/00 | (2006.01) |
| A63F 13/285 | (2014.01) |
| A63F 13/54 | (2014.01) |

(52) U.S. Cl.
CPC ............. G06F 3/016 (2013.01); G06F 3/16 (2013.01); G06F 3/167 (2013.01); G08B 6/00 (2013.01); *A63F 13/285* (2014.09); *A63F 13/54* (2014.09); *G06F 3/017* (2013.01); *G06F 2203/013* (2013.01); *G06F 2203/014* (2013.01)

(58) Field of Classification Search
CPC ............. G06F 3/016; G06F 3/16–167; A63F 2300/1037; A63F 2300/6063–6081; A63F 13/285
See application file for complete search history.

(56) References Cited

U.S. PATENT DOCUMENTS

| 8,710,968 B2 | 4/2014 | Sinha |
|---|---|---|
| 9,128,523 B2 | 9/2015 | Buuck et al. |

(Continued)

FOREIGN PATENT DOCUMENTS

| EP | 2 624 099 A1 | 8/2013 |
|---|---|---|
| EP | 2 629 178 A1 | 8/2013 |

(Continued)

OTHER PUBLICATIONS

Communication pursuant to Article 94(3) EPC issued in European Appl. No. 15194333.9, dated May 15, 2018.

*Primary Examiner* — Xuemei Zheng
(74) *Attorney, Agent, or Firm* — Medler Ferro Woodhouse & Mills PLLC

(57) ABSTRACT

A system generates haptic effects using at least one actuator and at least one speaker. The system receives a high definition ("HD") haptic effect signal and a corresponding audio signal if audio is to be played. The system generates a standard definition ("SD") haptic effect signal based at least on the HD haptic effect signal, and generates an audio based haptic effect signal based at least on the HD haptic effect signal. The system mixes the audio signal and the audio based haptic effect signal, and then substantially simultaneously plays the SD haptic effect signal on the actuator and plays the mixed signal on the speaker.

20 Claims, 4 Drawing Sheets

(56) References Cited

U.S. PATENT DOCUMENTS

| | | |
|---|---|---|
| 2002/0033795 A1 | 3/2002 | Shahoian et al. |
| 2004/0264705 A1 | 12/2004 | Hiipakka |
| 2005/0134561 A1 | 6/2005 | Tierling et al. |
| 2006/0017691 A1 | 1/2006 | Cruz-Hernandez et al. |
| 2008/0294984 A1 | 11/2008 | Ramsay et al. |
| 2010/0260371 A1* | 10/2010 | Afshar .................. H04R 7/24 381/394 |
| 2012/0086564 A1 | 4/2012 | Sinha |
| 2014/0105412 A1 | 4/2014 | Alves et al. |
| 2014/0176415 A1 | 6/2014 | Buuck et al. |

FOREIGN PATENT DOCUMENTS

| | | |
|---|---|---|
| EP | 2 846 221 A1 | 3/2015 |
| EP | 2 846 330 A1 | 3/2015 |

\* cited by examiner

US 10,429,933 B2

AUDIO ENHANCED SIMULATION OF HIGH BANDWIDTH HAPTIC EFFECTS

CROSS-REFERENCE TO RELATED APPLICATIONS

This application is a continuation of U.S. patent application Ser. No. 14/582,404, filed on Dec. 24, 2014, which is hereby incorporated by reference herein in its entirety.

FIELD

One embodiment is directed generally to a haptic effects, and in particular to high definition/bandwidth haptic effects.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

In order to generate vibration effects, many devices utilize some type of actuator or haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Haptic output devices also broadly include non-mechanical or non-vibratory devices such as those that use electrostatic friction ("ESF"), ultrasonic surface friction ("USF"), or those that induce acoustic radiation pressure with an ultrasonic haptic transducer, or those that use a haptic substrate and a flexible or deformable surface, or those that provide projected haptic output such as a puff of air using an air jet, and so on.

With the development of recent high resolution mobile devices such as smart phones and tablets, users are now able to view high definition audio and video on a handheld device that traditionally could only be seen in movie theaters, television or home theater systems. With haptically enabled mobile devices, experience has shown that content viewing is sufficiently enhanced, and viewers like it, if there is a haptic content component in addition to the audio and video content components. However, in order to be compatible with the high definition audio/video, corresponding high definition or high bandwidth haptic effects should also be generated.

SUMMARY

One embodiment is a system that generates haptic effects using at least one actuator and at least one speaker. The system receives a high definition ("HD") haptic effect signal and a corresponding audio signal if audio is to be played. The system generates a standard definition ("SD") haptic effect signal based at least on the HD haptic effect signal, and generates an audio based haptic effect signal based at least on the HD haptic effect signal. The system mixes the audio signal and the audio based haptic effect signal, and then substantially simultaneously plays the SD haptic effect signal on the actuator and plays the mixed signal on the speaker.

DETAILED DESCRIPTION

One embodiment generates high bandwidth/definition ("HD") haptic effects on a device that includes a co-located actuator and speaker, even when the actuator is a "standard definition" actuator. An audio component is determined that, based on the plant model of the device, causes the speaker to generate vibratory haptic effects by vibrating the device's casing that enhance haptic effects generated by the actuator. The combination of the haptic effects generated by the actuator and by the speaker causes the cumulative haptic effect to be a high bandwidth haptic effect. Therefore, the fast response and strength of a standard definition actuator along with audio speakers is leveraged to generate an HD-like experience for users.

Figure 1:
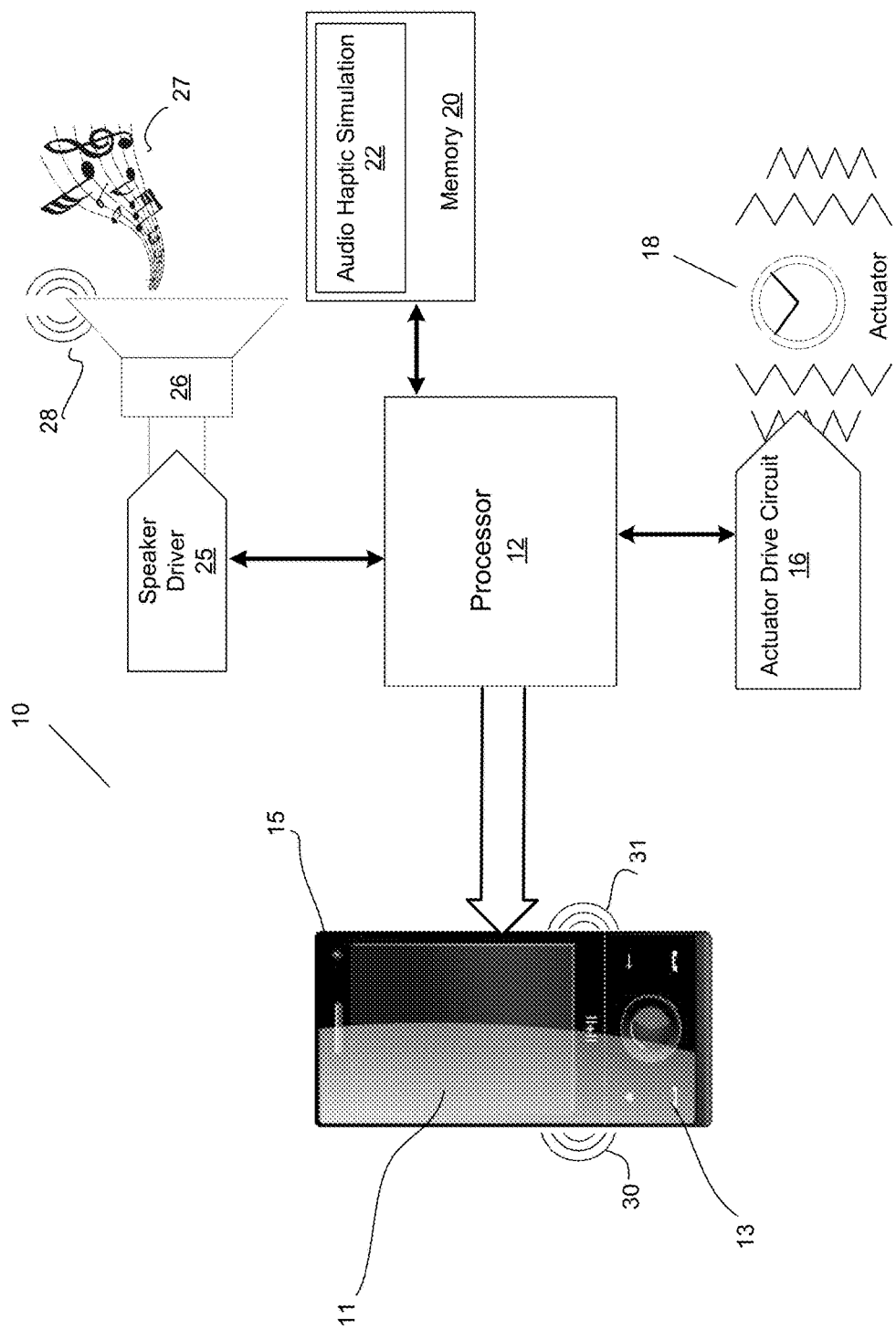
FIG. 1 is a block diagram of a haptically-enabled system/device in accordance with one embodiment of the present invention.

FIG. 1 is a block diagram of a haptically-enabled system/device 10 in accordance with one embodiment of the present invention. System 10 includes a touch sensitive surface 11 or other type of user interface mounted within a housing 15, and may include mechanical keys/buttons 13.

Internal to system 10 is a haptic feedback system that generates haptic effects on system 10 and includes a processor or controller 12. Coupled to processor 12 is a memory 20, and an actuator drive circuit 16 which is coupled to an actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction. The haptic feedback system in one embodiment generates vibrations 30, 31 or other types of haptic effects on system 10.

Processor 12 outputs the control signals to actuator drive circuit 16, which includes electronic components and circuitry used to supply actuator 18 with the required electrical current and voltage (i.e., "motor signals") to cause the desired haptic effects. System 10 may include more than one actuator 18, and each actuator may include a separate drive circuit 16, all coupled to a common processor 12.

System 10 further includes at least one speaker 26 and a corresponding speaker driver 25 coupled to processor 12. Speaker 26 can be any type of audio speaker or loudspeaker or electroacoustic transducer that generates an audio output 27 by converting an electrical audio signal into a corresponding sound. As is well known, coincident with the generation of audio 27, speaker 26 will generate vibrations 28 on system 10 such as by vibrating the housing/casing of system 10. The extent of how the vibrations 28 are felt by a user contacting system 10 depends in part on the physical makeup, or "plant model" of system 10.

Memory 20 can be any type of storage device or computer-readable medium, such as random access memory ("RAM") or read-only memory ("ROM"). Memory 20 stores instructions executed by processor 12. Among the instructions, memory 20 includes audio haptic simulation module 22, which are instructions that, when executed by processor 12, generates high bandwidth haptic effects using speaker 28 and actuator 18, as disclosed in more detail below. Memory 20 may also be located internal to processor 12, or any combination of internal and external memory.

System 10 may be any type of handheld/mobile device, such as a cellular telephone, personal digital assistant ("PDA"), smartphone, computer tablet, gaming console, remote control, or any other type of device that includes a haptic effect system that includes one or more actuators and one or more speakers. System 10 may be a wearable device such as wrist bands, headbands, eyeglasses, rings, leg bands, arrays integrated into clothing, etc., or any other type of device that a user may wear on a body or can be held by a user and that is haptically enabled, including furniture or a vehicle steering wheel. Further, some of the elements or functionality of system 10 may be remotely located or may be implemented by another device that is in communication with the remaining elements of system 10.

Actuator 18 may be any type of actuator that can generate a haptic effect. In one embodiment, actuator 18 is a "standard definition" ("SD") actuator that generates vibratory haptic effects at a single frequency. Examples of an SD actuator include an eccentric rotating mass motor ("ERM") and a linear resonant actuator ("LRA"). In contrast to an SD actuator, an HD actuator or high fidelity actuator such as a piezoelectric actuator or electroactive polymer ("EAP") actuator is capable of generating high bandwidth/definition haptic effects at multiple frequencies. HD actuators are characterized by their ability to produce wide bandwidth tactile effects with variable amplitude and with a fast response to transient drive signals. However, HD actuators have a large physical dimension relative to SD actuators, and are more expensive than SD actuators. Most devices consequently include only one or more SD actuators, instead of any HD actuators. Therefore, embodiments of the invention leverage the existing one or more speakers in those devices in combination with the SD actuators to simulate HD haptic effects and provide an HD-like haptic experience without the need for HD actuators.

In addition to, or in place of, actuator 18, system 10 may include other types of haptic output devices (not shown) that may be non-mechanical or non-vibratory devices such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, etc.

Figure 2:
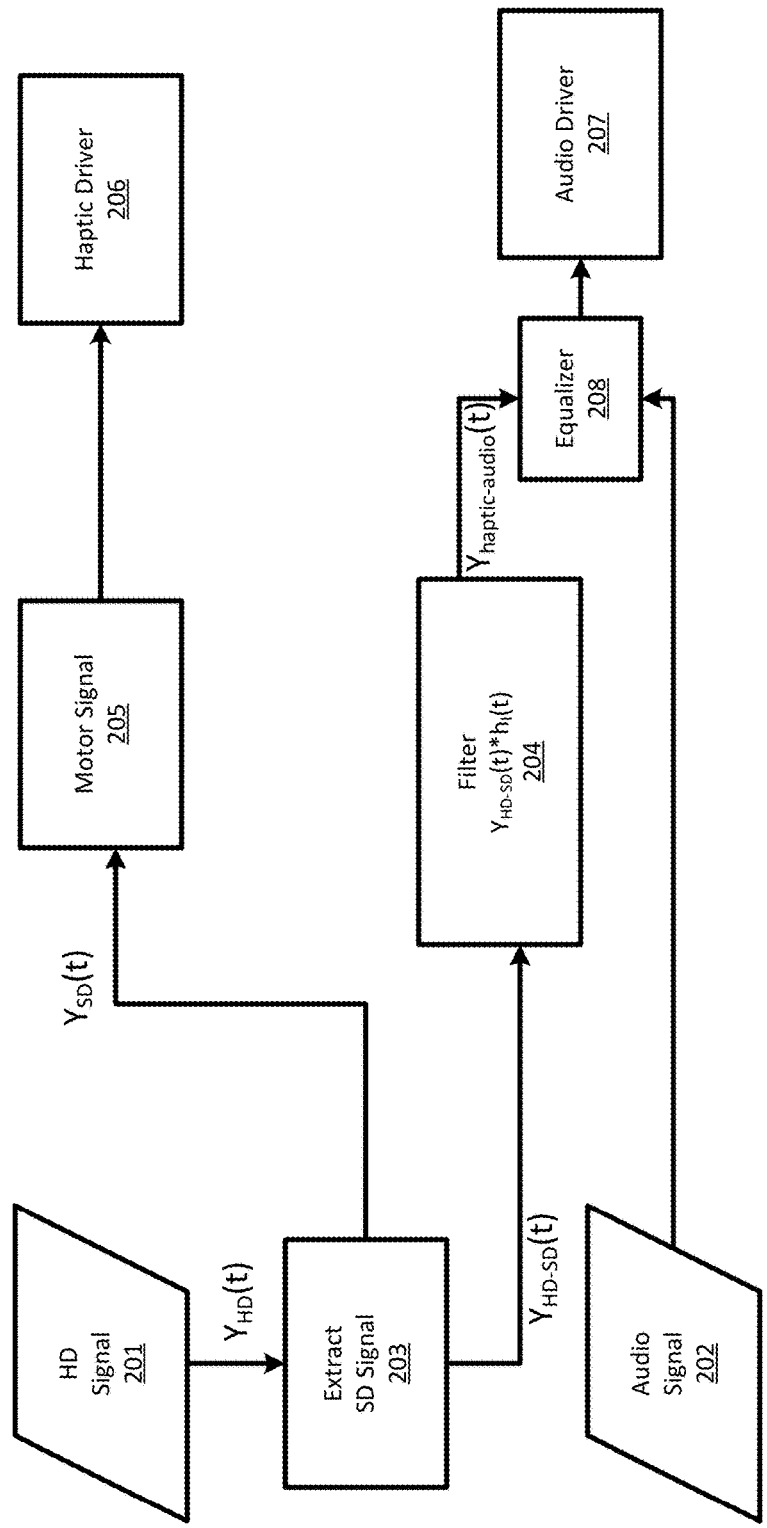
FIG. 2 is a flow diagram of the functionality of the system of FIG. 1 in accordance with an embodiment of the invention.

FIG. 2 is a flow diagram of the functionality of system 10 of FIG. 1 in accordance with an embodiment of the invention. In one embodiment, the functionality of the flow diagram of FIG. 2 (and FIGS. 4a and 4b below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 201, an HD haptic effect signal is received. The HD signal can be created by a haptic effect designer using known tools such as "TouchSense Studio®" from Immersion Corp. or an industry standard audio production tool such as "Pro Tools" from Avid Technology, Inc. In comparison to an SD haptic effect signal, an HD haptic effect signal has a wide haptic bandwidth (e.g., 1-350 Hz), increased range, strength and precision, and a high sampling rate. The HD signal at 201 can also be generated in any known manner, including using automated audio/video to haptic effect conversion tools, or using haptic-audio synthesis algorithms such as granular synthesis, physical synthesis, etc. In another embodiment, the HD signal is derived from using one or more sensors that capture high resolution, wide band acceleration and/or audio signals. The HD signal is in the form of "$Y_{HD}(t)$", where Y is the amplitude of the HD signal over time "t".

At 202, an audio signal is received. The audio signal and the HD signal are intended to complement each other and correspond to the same video display if video is available. The HD signal is generated in conjunction with the audio signal. In another embodiment, the audio signal is not needed, and just the HD signal is played.

At 203, an SD signal is extracted from the HD signal. The resulting signals are "$Y_{HD-SD}(t)$" (i.e., the HD signal minus the SD signal) that is determined, for example, by using a notch filter to remove LRA resonance, and $Y_{SD}(t)$ (i.e., the SD signal) that is determined by computing the signal amplitude (i.e., an audio based haptic effect signal). Other types of SD actuators may require other SD extraction algorithms including both linear and non-linear filtering.

At 205, the SD signal is converted into motor signals, and at 206 the motor signals are sent to the haptic driver where they are converted into an SD vibratory haptic effect using an SD actuator such as an LRA actuator.

At 204, the HD portion minus the SD portion of the filtered signal is converted into an audio input that will cause the speaker to generate an HD component of the haptic effect when the audio is played by the speaker. In general, the filter applies the function of "$Y_{HD-SD}(t)*h_f(t)$" to generate an audio signal "$Y_{haptic-audio}(t)$." This is the convolution product of the filtered HD signal $Y_{HD-SD}(t)$ and the inverse plant model for the acceleration generated by the audio system 28 on the system 10. The filter and function is based on the determined plant model of target device, such as system 10 (i.e., the device that includes the actuators and speakers and on which the haptic effects will be generated). However, other methods of generating an audio signal that generate the desired accelerations may also be used. For example, a look up table, feed forward system model, neural network or any other system estimation technique can be used.

At 208, the audio based haptic effect signal $Y_{haptic-audio}(t)$ generated at 204 and the corresponding input audio signal at 202 (if an audio signal is to be played) are mixed, optionally using an equalizer, and sent to an audio driver at 207, which results in the mixed audio signal being played by the speaker. The filter at 204 or the audio driver at 207 may need to equalize frequencies that overlap between the audio signal at 202 and the filtered output $Y_{haptic\text{-}audio}(t)$ in order to preserve both the resulting sound pressure level and the induced acceleration.

As described in conjunction with FIG. 2, the filtering at 204 requires as input the plant model of the target device that will generate the haptic effect. The plant model is an input-output system model based on the measured or modeled frequency response characteristics of the target device. The plant model can also be referred to as an estimation of filter/equalizer parameters using system identification, an "acoustic model" or a "tactile speaker model". The field of system identification uses statistical methods to build mathematical models of dynamical systems from measured data. System identification also includes the optimal design of experiments for efficiently generating informative data for fitting such models as well as model reduction.

Figure 3:
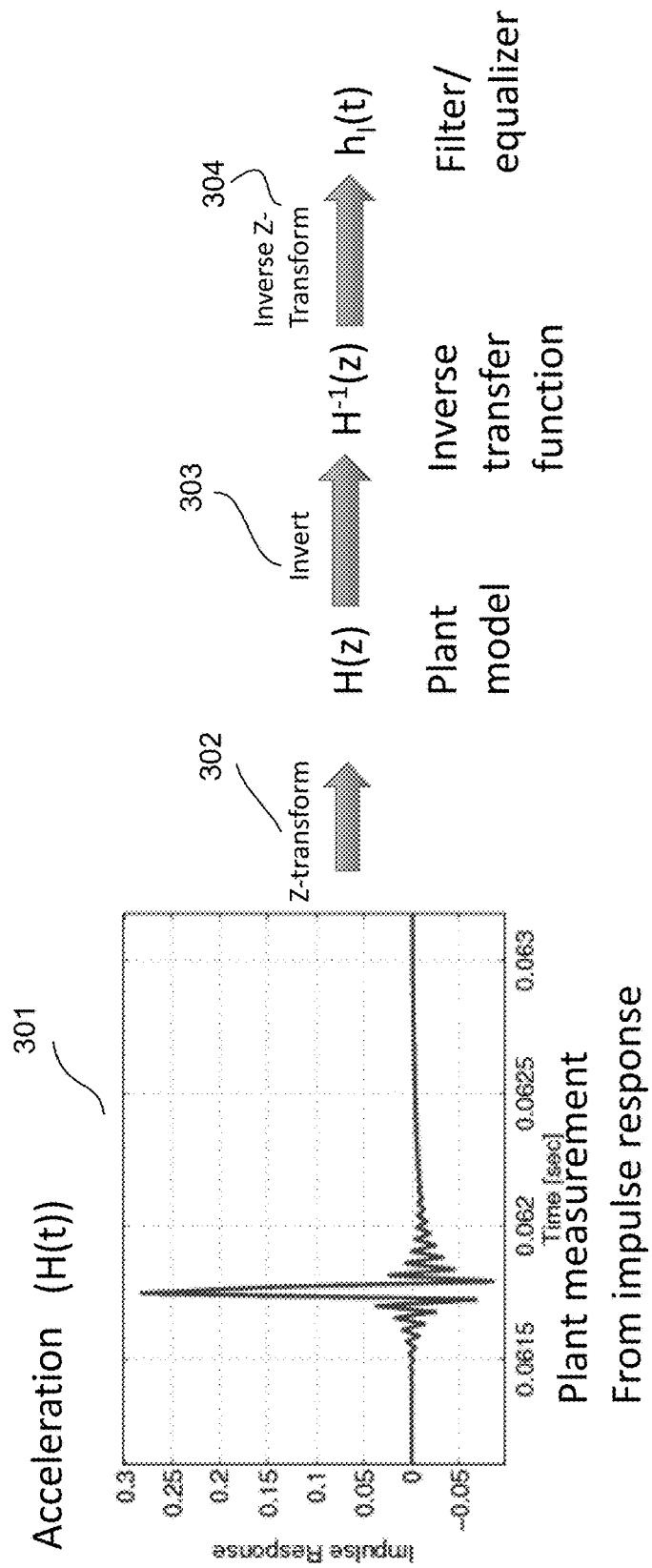
FIG. 3 illustrates a process for determining the system identification or the plant model for a target device such as the system of FIG. 1 in accordance with one embodiment.

FIG. 3 illustrates a process for determining the system identification or the plant model for a target device such as system 10 in accordance with one embodiment. An impulse response is captured for the audio system to capture the acceleration response to an audio impulse. Assuming that system 10 has a linear response, this impulse response 301 can be used directly to create the filter at 204 of FIG. 2, as shown in FIG. 3. First, the impulse response is transformed using a Z-transform (302) to create the plant model. The plant model is then inverted (303) to create a Z-space function that can represent the inverse of the linear system dynamics. This function is also referred to as an "inverse transfer function." Finally, the inverse transfer function is transformed back (304) to create a filter that represents the inverse system dynamics. While 301 represents a transformation from an audio stimulus to acceleration, the filter at 304 transforms target acceleration into audio (i.e., it represents the inverse of the system 10 with respect to acceleration). This is the input-output model (i.e., plant model) where "$h_f(t)$" is a discrete time filter that can be applied to the haptic signal at 204 of FIG. 2 using a convolution: $Y_{haptic\text{-}audio}(t)=Y_{HD\text{-}SD}(t)*h_f(t)$.

Figure 4B:
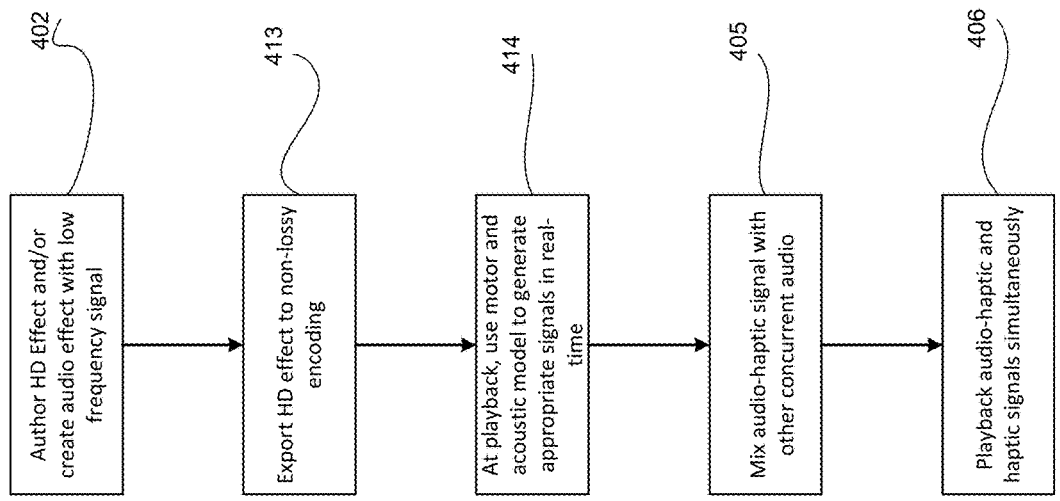
FIGS. 4a and 4b are flow diagrams of the functionality of the system of FIG. 1 in accordance with an embodiment of the invention.
Figure 4A:
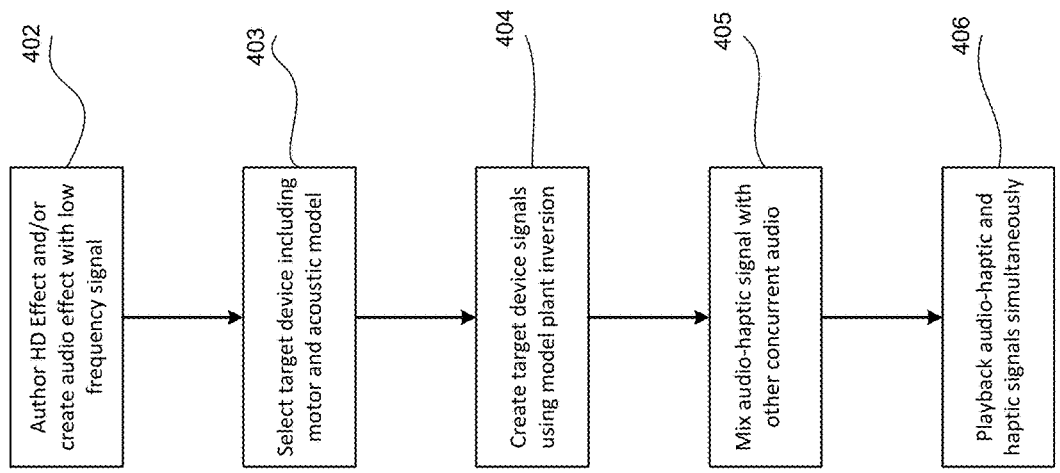

FIGS. 4a and 4b are flow diagrams of the functionality of system 10 of FIG. 1 in accordance with an embodiment of the invention. FIG. 4a can be considered an "off-line" embodiment, and FIG. 4b can be considered an "on-line" or "real-time" embodiment.

At 402, the author or content creator creates a new HD haptic effect using available content authoring tools. The HD effect can be created using audio conversion tools or using direct synthesis. One example of an audio conversion tool is "TouchSense Studio®" from Immersion Corp. In another embodiment, an audio effect with low frequency signal can be created at 402 that corresponds to an SD haptic effect. In this embodiment, instead of using TouchSense Studio®, for example, the content author may be working in an audio workflow such as Pro Tools. The author may create an HD low frequency signal directly (e.g., the "0.1" signal in a "5.1" surround sound). The author can create the signal so that the 0.1 track includes the correct mix of signals to drive an SD actuator directly and can create the HD effect using the on-device speaker as disclosed above.

In another embodiment, the content author can create the HD audio directly in the audio tool and create a SD effect using either the audio tool or TouchSense Studio®. In this embodiment, there is no need for filtering at 204 of FIG. 2 since the SD and HD signals are already distinct.

At 403, the target device is selected. For each stored target device that is chosen at 403, the corresponding plant model, type/number/location of each actuator and/or type/number/location of each speaker is stored. In one embodiment, using an export filter in the content authoring tool or a post processing tool, the user can select the specific target device for the effect to be deployed to (e.g., Galaxy S5, Galaxy Gear, Apple Watch, etc.).

At 404, the target device signals are created using the model plant inversion. The target device signals are $Y_{haptic\text{-}audio}(t)$ (i.e., the audio based haptic signal) and $Y_{haptic\text{-}audio}(t)$ (i.e., the SD haptic signal), as shown in FIG. 2. Embodiments use previously created mechanical and acoustic models of the target device, and split the HD effect into a component that will be rendered using the mechanical actuator and one that will be rendered using the speaker. This can be accomplished in one embodiment, as described above, with a transfer function, iteration/optimization and other model based signal transformations. The two generated haptic signals are saved using appropriate encodings, such as saving the audio signal as a .wav file, and the haptic signal as a .hapt file.

At 405, the audio-haptic signal is mixed with other concurrent audio, if audio is to be played concurrently with the haptic effect.

At 406, the audio-haptic signals (i.e., $Y_{haptic\text{-}audio}(t)$) and haptic signals (i.e., $Y_{haptic\text{-}audio}(t)$) are played back simultaneously or substantially simultaneously on the target device at runtime, using a software development kit ("SDK") or other programmatic methods.

Referring to FIG. 4b, at 402 the HD haptic effect is authored as in 402 of FIG. 4a.

At 413, the HD haptic effect is exported to a non-lossy encoding (e.g., .ivt encoding).

At 414, at playback time, a plant model is used, configured for the specific target device, to create a mechanical drive signal and an acoustic drive signal in real-time or substantially real-time. This can be accomplished with a transfer function, iteration/optimization and other real-time model based signal transformations.

405 and 406 are the same functionality as 405 and 406 of FIG. 4a.

In another embodiment, an SD haptic effect and a haptic-audio effect is directly authored at the beginning of the process (i.e., instead of 402 of FIG. 4a). In this embodiment, 403 and 404 of FIG. 4a can be skipped, and 405 and 406 are executed to play the haptic effects.

As disclosed, embodiments receive an SD haptic effect and an audio-based haptic effect. The SD haptic effect is played by an actuator, which can be an SD actuator. The audio-based haptic effect is played by a speaker concurrently with the corresponding audio. The combination of vibratory haptic effects generated by the actuator and the speaker provides an HD-like haptic effect having a wide bandwidth, without the need of an HD actuator.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of generating haptic effects, the method comprising:
   receiving a high definition haptic effect signal;
   selecting a target device including an actuator and a speaker;
   generating a first component signal as a standard definition haptic effect signal based at least on the high definition haptic effect signal and an actuator plant model of the actuator of the target device;
   generating a second component signal as an audio based haptic effect signal based at least on the high definition haptic effect signal and a speaker plant model of the speaker of the target device; and
   substantially simultaneously playing the standard definition haptic effect signal on the actuator and playing the audio based haptic effect on the speaker.

2. The method of claim 1, further comprising:
   receiving an audio signal; and
   mixing the audio signal and the second component signal into a mixed signal, wherein playing the second component signal on the speaker includes playing the mixed signal on the speaker.

3. The method of claim 2, wherein mixing comprises equalizing overlapping frequencies between the audio signal and the second component signal.

4. The method of claim 1, wherein the high definition haptic effect signal includes a plurality of frequencies in a range of between 1 Hz and 250 Hz.

5. The method of claim 1, further comprising determining the speaker plant model of the speaker of the target device by measuring an impulse response to an acceleration impulse input.

6. The method of claim 1, wherein at least a portion of the first component signal and the second component signal are generated during playing of the first component signal and the second component signal.

7. The method of claim 1, wherein the first component signal and the second component signal are created prior to playing the first component signal and the second component signal.

8. The method of claim 1, wherein the target device is selected from a plurality of stored target devices, each of the plurality of stored target devices having a corresponding actuator plant model and a corresponding speaker plant model.

9. The method of claim 1, wherein the first component signal and the second component signal are created by the target device.

10. The method of claim 1, further comprising receiving, by the target device, the first component signal and the second component signal.

11. A haptically-enabled device configured to play haptic effects comprising:
    an actuator;
    a speaker; and
    a processor configured to
    receive a high definition haptic effect signal,
    generate a first component signal as a standard definition haptic effect signal for rendering on the actuator based on the high definition haptic effect signal and an actuator plant model of the actuator,
    generate a second component signal as an audio based haptic effect signal for rendering on the speaker based on the high definition haptic effect signal and a speaker plant model of the speaker, and
    substantially simultaneously cause the actuator to play the first component signal and the speaker to play the second component signal.

12. The device of claim 11, wherein the processor is further configured to
    receive an audio signal,
    mix the audio signal and the second component signal into a mixed signal, and
    cause the speaker to play the mixed signal.

13. The device of claim 12, wherein the processor is configured to mix the audio signal and the second component signal by equalizing overlapping frequencies between the audio signal and the second component signal.

14. The device of claim 11, wherein the high definition haptic effect signal includes a plurality of frequencies in a range of between 1 Hz and 250 Hz.

15. The device of claim 11, wherein the speaker plant model of the haptically-enabled device is determined by measuring an impulse response to an acceleration impulse input.

16. The device of claim 11, wherein the processor is further configured to generate at least a portion of the first component signal and the second component signal during playing of the first component signal and the second component signal.

17. The device of claim 11, wherein the first component signal and the second component signal are created prior to playing the first component signal and the second component signal.

18. A non-transitory computer readable medium storing computer instructions for execution on a processor, the computer instructions configured to cause the processor to:
    receive a high definition haptic effect signal;
    select a target device including an actuator and a speaker;
    generate a first component signal as a standard definition haptic effect signal for rendering on the actuator based on the high definition haptic effect signal and an actuator plant model of the actuator;
    generate a second component signal as an audio based haptic effect signal for rendering on the speaker based on the high definition haptic effect signal and a speaker plant model of the speaker; and
    substantially simultaneously cause the actuator of the target device to play the first component signal and the speaker of the target device to play the second component signal.

19. The non-transitory computer readable medium of claim 18, wherein the computer instructions are further configured to cause the processor to:
    select the target device from a plurality of stored target devices, each of the plurality of stored target devices having a corresponding actuator plant model and a corresponding speaker plant model.

20. The non-transitory computer readable medium of claim 18, wherein the computer instructions are further configured to cause the processor to determine the speaker plant model by measuring an impulse response to an acceleration impulse input.

* * * * *